United States Patent
Liljestrand et al.

(10) Patent No.: US 9,399,940 B2
(45) Date of Patent: Jul. 26, 2016

(54) METHOD AND DEVICE PERTAINING TO DOSING UNIT OF SCR SYSTEM

(75) Inventors: Andreas Liljestrand, Södertälje (SE); Per Bremberg, Södertälje (SE); Daniel Arvidsson, Värmdö (SE)

(73) Assignee: SCANIA CV AB (SE)

( * ) Notice: Subject to any disclaimer, the term of this patent is extended or adjusted under 35 U.S.C. 154(b) by 3 days.

(21) Appl. No.: 13/805,024

(22) PCT Filed: Jun. 20, 2011

(86) PCT No.: PCT/SE2011/050797
§ 371 (c)(1), (2), (4) Date: Jan. 23, 2013

(87) PCT Pub. No.: WO2011/162699
PCT Pub. Date: Dec. 29, 2011

(65) Prior Publication Data
US 2013/0111883 A1    May 9, 2013

(30) Foreign Application Priority Data
Jun. 21, 2010   (SE) ........................................ 1050651

(51) Int. Cl.
*F01N 3/00*   (2006.01)
*F01N 3/10*   (2006.01)
(Continued)

(52) U.S. Cl.
CPC    *F01N 3/10* (2013.01); *F01N 3/208* (2013.01); *F01N 9/00* (2013.01); *F01N 11/00* (2013.01);
(Continued)

(58) Field of Classification Search
CPC ......... F01N 3/023; F01N 3/0253; F01N 3/10; F01N 3/208; F01N 9/002; F01N 9/00; F01N 11/00; F01N 11/002

USPC .................................................... 60/272–324
See application file for complete search history.

(56) References Cited

U.S. PATENT DOCUMENTS 7,958,721 B2 * 6/2011 Craig et al. ..................... 60/286
8,006,482 B2 * 8/2011 Cox et al. ....................... 60/286
(Continued)

FOREIGN PATENT DOCUMENTS

EP    1 655 463    5/2006
EP    1 672 191    6/2006
(Continued)

OTHER PUBLICATIONS

International Search Report mailed Oct. 11, 2011 in corresponding PCT International Application No. PCT/SE2011/050797.
(Continued)

*Primary Examiner* — Thomas Denion
*Assistant Examiner* — Kelsey Stanek
(74) *Attorney, Agent, or Firm* — Ostrolenk Faber LLP

(57) ABSTRACT

A method pertaining to an SCR system for cleaning of exhaust gases from an engine including a dosing unit (250) to supply a reducing agent to an exhaust duct (240): Determining (s340) whether there is an undesired temperature level of the dosing unit (250). If one is found, removing (s360) warmed reducing agent from the dosing unit (250) and supplying it to the exhaust duct (240). Calculating (s350) and removing an amount of reducing agent based on a prevailing temperature of the dosing unit (250), or removing warmed reducing agent. Also a computer program product containing program code (P) for a computer (200; 210) for implementing the method. Also a device of an SCR system and a motor vehicle (100) which is equipped with the device are disclosed.

24 Claims, 3 Drawing Sheets

(51) Int. Cl.
  *F01N 3/20* (2006.01)
  *F01N 9/00* (2006.01)
  *F01N 11/00* (2006.01)

(52) U.S. Cl.
  CPC .......... *F01N 11/002* (2013.01); *F01N 2550/05* (2013.01); *F01N 2610/02* (2013.01); *F01N 2610/10* (2013.01); *F01N 2610/11* (2013.01); *F01N 2610/146* (2013.01); *F01N 2610/1493* (2013.01); *F01N 2900/0408* (2013.01); *F01N 2900/1811* (2013.01); *Y02T 10/24* (2013.01); *Y02T 10/47* (2013.01)

(56) References Cited

U.S. PATENT DOCUMENTS

| | | | |
|---|---|---|---|
| 8,171,721 B2 | 5/2012 | Boddy et al. | 60/286 |
| 8,484,947 B2 * | 7/2013 | Urven et al. | 60/286 |
| 8,561,392 B2 | 10/2013 | Ogunleye et al. | 60/286 |
| 2007/0163232 A1 * | 7/2007 | Ueno | 60/274 |
| 2009/0301063 A1 * | 12/2009 | Tahara et al. | 60/286 |
| 2010/0005871 A1 * | 1/2010 | Kitazawa | 73/114.69 |
| 2010/0212290 A1 | 8/2010 | Thiagarajan et al. | 60/274 |
| 2010/0229532 A1 | 9/2010 | Ohno | 60/274 |
| 2011/0314820 A1 | 12/2011 | Plougmann | 60/689 |

FOREIGN PATENT DOCUMENTS

| | | |
|---|---|---|
| EP | 1 933 014 | 6/2008 |
| WO | WO 2008/006840 | 1/2008 |
| WO | WO 2009/020541 | 2/2009 |
| WO | WO 2010/003424 | 1/2010 |
| WO | WO 2010003424 A1 * | 1/2010 |

OTHER PUBLICATIONS

Office Action dated Nov. 4, 2014 issued in U.S. Appl. No. 13/805,127.

* cited by examiner

US 9,399,940 B2

METHOD AND DEVICE PERTAINING TO DOSING UNIT OF SCR SYSTEM

CROSS-REFERENCE TO RELATED APPLICATIONS

The present application is a 35 U.S.C. §§371 national phase conversion of PCT/SE2011/050797, filed Jun. 20, 2011, which claims priority of Swedish Application No. 1050651-7, filed Jun. 21, 2010, the contents of which are incorporated by reference herein. The PCT International Application was published in the English language.

TECHNICAL FIELD

The present invention relates to a method pertaining to an SCR system for cleaning of exhaust gases from an engine, comprising a dosing unit to supply a reducing agent to an exhaust duct. The invention relates also to a computer program product containing program code for a computer for implementing a method according to the invention. The invention relates also to a device of an SCR system for exhaust cleaning and a motor vehicle which is equipped with the device.

BACKGROUND

Vehicles today use, for example, urea as reductant in SCR (selective catalytic reduction) systems which comprise an SCR catalyst, in which catalyst said reductant and NOx gas can react and be converted to nitrogen gas and water. Various types of reductants may be used in SCR systems. AdBlue is an example of a commonly used reductant.

One type of SCR system comprises a container for a reductant. The SCR system may also have a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines stored in a control unit of the vehicle. To make it easier to regulate the pressure when no or only small amounts are being dosed, the system also comprises a return hose which runs back from a pressure side of the system to the container. This configuration makes it possible to cool the dosing unit by means of the reductant which, during cooling, flows from the container via the pump and the dosing unit and back to the container. The dosing unit is thus provided with active cooling. The return flow from the dosing valve to the container may be substantially constant.

During operation of the SCR system, thermal energy is stored in the exhaust system. This thermal energy may be transferred to, for example, the dosing unit.

Certain operating situations in which a cooling flow for the dosing unit is insufficient involve risk of the dosing unit being degraded functionally, becoming overheated and sustaining permanent damage or even completely disintegrating. Even temperatures which are not critical for hardware of the SCR system entail risk that the reductant therein might be adversely affected by too high temperatures, which might result in crystallisation of the reductant potentially leading to obstruction of, for example, the dosing unit.

WO 2009/020541 describes a system for emptying a reducing substance out of an injection system. The system has a heater connected to an injector with the object, for example, of vaporising the substance from the injector in order to avoid blockages in the injection system. However, the heater occupies space and its operation involves costs with regard to development, fitting, supervision during operation, and maintenance.

WO 2008/006840 describes a system for storing and supplying an additive substance in an exhaust system.

WO 2010/003424 A1 is mainly concerned with the temperature of the walls of the exhaust duct, which have been found, above a certain temperature, e.g. 200 degrees Celsius, to generate urea deposits in a nozzle from which the reducing agent is supplied to the exhaust duct. Above a certain temperature, an operating mode whereby reducing agent is from time to time used to blow the nozzle clear of deposits is therefore employed.

There is thus a need to improve current SCR systems in order to reduce or eliminate the above disadvantages.

SUMMARY OF THE INVENTION

An object of the present invention is to propose a novel and advantageous method for improving the performance of an SCR system.

An object of the present invention is to propose a novel and advantageous method for improving the performance of an SCR system when a dosing unit has insufficient or no cooling flow.

Another object of the invention is to propose a novel and advantageous device of an SCR system and a novel and advantageous computer program for improving the performance of an SCR system.

Another object of the invention is to propose a novel and advantageous device of an SCR system and a novel and advantageous computer program for improving the performance of an SCR system when a dosing unit has insufficient or no cooling flow.

An object of the present invention is to propose a method pertaining to an SCR system, which method results in reduced risk of undesirable functional degradation of components of the SCR system and/or reduced risk of obstruction of components, e.g. a dosing unit, of the SCR system with respect to a reducing agent.

A further object of the invention is to propose an alternative method pertaining to an SCR system and an alternative computer program pertaining to an SCR system, and an alternative device of an SCR system.

These objects are achieved with a method pertaining to SCR systems for exhaust cleaning, according to the disclosure herein.

An aspect of the invention proposes a method pertaining to an SCR system for cleaning of exhaust gases from an engine which comprises a dosing unit to supply a reducing agent to an exhaust duct, comprising the step of determining whether there is an undesired temperature level of said dosing unit. The method comprises also the step, if there is found to be said undesired temperature level, of removing warmed reducing agent from said dosing unit by supplying it to said exhaust duct, which entails calculating and removing an amount of reducing agent which is removable on the basis of a prevailing temperature of the dosing unit, or removing a predetermined amount in the form of substantially all of the dosing unit's warmed reducing agent from it to said exhaust duct.

This reduces risk of formation in the dosing unit of by-products of the reducing agent which might otherwise lead to malfunctions, e.g. incorrect codes in control systems. These by-products might also result in emissions of the SCR system not being reduced to a desirable extent.

Said determination of whether there is said undesired temperature level may be done after cessation of an exhaust flow. In operating situations where the engine of the SCR system is switched off after running at high power offtake, evacuation of warmed reducing agent in the dosing unit may help to lower an undesired high temperature of the dosing unit.

The method may comprise the step of continuously cooling said dosing unit by means of a flow of said reducing agent. Combined continuous cooling of the dosing unit by said reducing agent and dosing of warmed reducing agent from the dosing unit into the exhaust duct results in positive synergy effects leading to improved cooling of the dosing unit, particularly after the engine of the SCR system has been switched off.

The method may comprise the step of intermittently removing reducing agent from said dosing unit by supplying it to said exhaust duct. Intermittently removing reducing agent makes it possible for heat transfer between the dosing unit and the reducing agent to be allowed in controlled forms. An energy value of the reductant may thus be raised. At suitable times at least part of the dosing unit's warmed reductant may be dosed into the exhaust duct of the SCR system.

Immediately after cessation of an exhaust flow of the exhaust duct, the amount of reducing agent removed needs to be limited so that too much reducing agent is not supplied to the exhaust duct. During a start-up of the SCR system, the exhaust duct will be warmed and help to vaporise the amount of reducing agent removed, for use in the SCR catalyst in conventional ways.

Said undesired temperature level may be within a predetermined range, e.g. 80-130 degrees Celsius. A suitable value for said undesired temperature level may be chosen on the basis of characteristics of the respective reducing agent.

The method may comprise the step of continuously determining a prevailing temperature of the dosing unit in order to continuously determine whether there is an undesired temperature level of a dosing unit. The result is a reliable method pertaining to an SCR system whereby calculations of the amount of reducing agent to be removed may be based on relevant input data.

The method may comprise the step of calculating an amount of reducing agent which is removable on the basis of a prevailing temperature of the dosing unit. This makes it possible for an optimised amount of reducing agent to be removed from the dosing unit into the exhaust duct. The calculated amount of reducing agent may be dosed at a determined suitable time. The calculated amount of reducing agent may be dosed intermittently in a suitable way.

The method may comprise the step of removing a predetermined amount of reducing agent from said dosing unit. The predetermined amount of reducing agent may be substantially all of the dosing unit's available warmed reducing agent. This step has the advantage of constituting a variant which involves less calculation capacity.

The method may comprise the step of removing reducing agent from said dosing unit by existing pressurisation of the reducing agent in the dosing unit. Said existing pressurisation may be by a pump of the SCR system. According to an alternative version, said reducing agent may be removed by internal pressure of the SCR system.

Said reducing agent may be a urea-based reducing agent, e.g. AdBlue.

An aspect of the invention proposes a device of an SCR system for cleaning of exhaust gases from an engine which comprises a dosing unit to supply a reducing agent to an exhaust duct, comprising means for determining whether there is an undesired temperature level of said dosing unit, and means, if there is found to be said undesired temperature level, for removing warmed reducing agent from said dosing unit by supplying it to said exhaust duct, which entails using means for calculating and removing an amount of reducing agent which is removable on the basis of a prevailing temperature of the dosing unit, or means for removing a predetermined amount in the form of substantially all of the dosing unit's warmed reducing agent from it to said exhaust duct.

Said determination of whether there is said undesired temperature level may be done after cessation of an exhaust flow.

The device may comprise means for continuously cooling said dosing unit by means of a flow of said reducing agent.

The device may comprise means for intermittently removing reducing agent from said dosing unit by supplying it to said exhaust duct.

The device may comprise means for continuously determining a prevailing temperature of the dosing unit in order to continuously determine whether there is an undesired temperature level of a dosing unit.

The device may comprise means for calculating an amount of warmed reducing agent which is removable on the basis of a prevailing temperature of the dosing unit.

The device may comprise means for removing a predetermined amount of reducing agent from said dosing unit.

The device may comprise means for removing reducing agent from said dosing unit by existing pressurisation of the reducing agent in the dosing unit.

The above objects are also achieved with a motor vehicle which comprises the features of the device herein described of an SCR system. The vehicle may be a truck, bus or passenger car.

An aspect of the invention proposes a computer program pertaining to SCR systems for exhaust cleaning which contains program code for causing an electronic control unit or another computer connected to the electronic control unit to perform steps according to the disclosure herein.

An aspect of the invention proposes a computer program pertaining to SCR systems for exhaust cleaning which contains program code stored on a computer-readable medium for causing an electronic control unit or another computer connected to the electronic control unit to perform steps according to the disclosure herein.

An aspect of the invention proposes a computer program product containing a program code stored on a computer-readable medium for performing method steps according to the disclosure herein when said program is run on an electronic control unit or another computer connected to the electronic control unit.

The method is easy to implement in existing motor vehicles. Software pertaining to SCR systems for exhaust cleaning according to the invention may be installed in a control unit of the vehicle during the manufacture of the vehicle. A purchaser of the vehicle may thus have the possibility of selecting the function of the method as an option. Alternatively, software which comprises program code for applying the innovative method pertaining to SCR systems for exhaust cleaning may be installed in a control unit of the vehicle on the occasion of upgrading at a service station, in which case the software may be loaded into a memory in the control unit. Implementing the innovative method is therefore cost-effective, particularly since no further sensors or components need be installed in the vehicle. Relevant hardware is currently already provided in the vehicle. The invention therefore represents a cost-effective solution to the problems indicated above.

Software comprising program code pertaining to SCR systems for exhaust cleaning is easy to update or replace. Moreover, different parts of the software containing program code pertaining to SCR systems for exhaust cleaning may be replaced independently of one another. This modular configuration is advantageous from a maintenance perspective.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
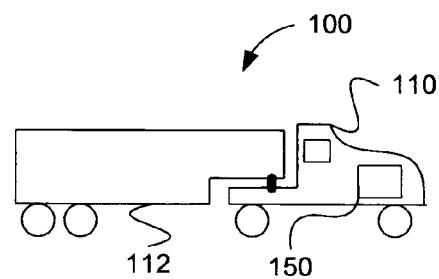
FIG. 1 illustrates schematically a vehicle according to an embodiment of the invention.

FIG. 1 depicts a side view of a vehicle 100. The exemplified vehicle 100 comprises a tractor unit 110 with an engine 150 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method pertaining to an SCR system and the innovative device of a device according to an aspect of the invention are well suited to other platforms which have an SCR system than motor vehicles, e.g. watercraft. The watercraft may be of any kind, e.g. motorboats, steamers, ferries or ships.

The innovative method pertaining to an SCR system and the innovative device of a device according to an aspect of the invention are also well suited to various kinds of power plants, e.g. an electric power plant comprising a diesel generator.

The innovative method pertaining to an SCR system and the innovative device of a device are well suited to any engine system which comprises an engine and an SCR system, e.g. on a locomotive or some other platform.

The innovative method pertaining to an SCR system and the innovative device of a device are well suited to any system which comprises an NO generator and an SCR system.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reductant in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. concerning temperature levels at which functional degradation of a given reductant is initiated, in control algorithms for executing software code in accordance with the innovative method.

Figure 2:
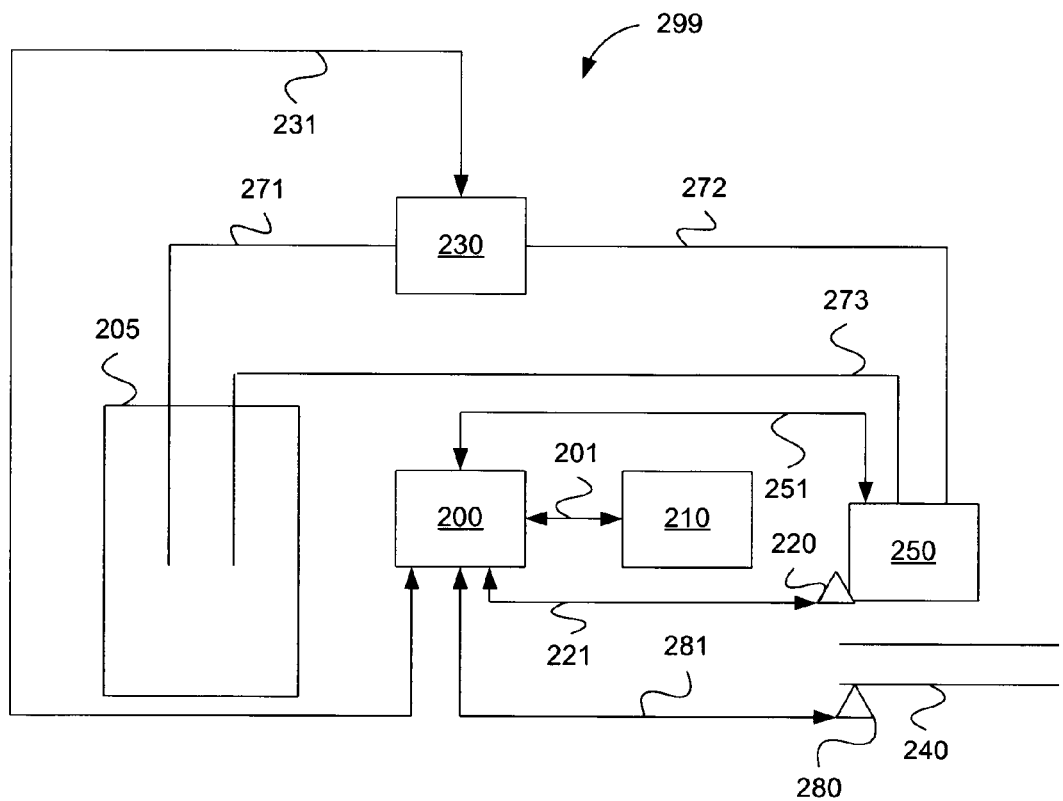
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump. The pump 230 is adapted to being driven by an electric motor. The pump 230 is adapted to drawing the reductant from the container 205 via the first line 271 and supplying it via a second line 272 to a dosing unit 250. The dosing unit 250 comprises an electrically controlled dosing valve by means of which an outflow of added reductant can be controlled. The pump 230 is adapted to pressurising the reductant in the second line 272. The dosing unit 250 is provided with a throttle unit against which said pressure of the reductant is built up in the subsystem 299.

The dosing unit 250 is adapted to supplying said reductant to an exhaust duct 240 of an exhaust system (not depicted) of the vehicle 100. The exhaust duct 240 is adapted to leading exhaust gases from the engine 150 to surroundings of the SCR system. More specifically, the dosing unit 250 is adapted to supplying a suitable amount of reductant in a controlled way to an exhaust duct 240 of the vehicle 100. According to this version, an SCR catalyst (not depicted) is situated downstream of a location in the exhaust system where the reductant supply is effected. According to a variant, the amount of reductant supplied in the exhaust system is intended to be used in a conventional way in the SCR catalyst in order to reduce the amount of undesirable emissions in a known way. According to an aspect of the invention, where applicable, the dosed amount of reductant is not primarily intended to be used directly in the SCR catalyst but to carry thermal energy with it from the dosing unit 250 to the exhaust duct 240.

The dosing unit 250 is situated adjacent to the exhaust duct 240 which is adapted to leading exhaust gases from the combustion engine 150 of the vehicle 100 to the SCR catalyst. The dosing unit 250 is situated in thermal contact with the exhaust system of the vehicle 100. This means that thermal energy stored in, for example, the exhaust duct 240, silencer and SCR catalyst can thus be led to the dosing unit 250. The reductant present in the dosing unit 250 is thus also warmed.

The dosing unit 250 is provided with an electronic control card which is adapted to handling communication with a control unit 200. The dosing unit 250 comprises also plastic and/or rubber components which might melt or be otherwise adversely affected as a result of too high temperatures.

The dosing unit 250 is itself sensitive to temperatures above a certain value, e.g. 120 degrees Celsius. As for example the exhaust duct 240, the silencer and the SCR catalyst of the vehicle 100 exceed this temperature value, there is risk that the dosing unit might become overheated during or after operation of the vehicle if not provided with cooling.

It should be noted that reductant present in the dosing unit 250 might be adversely affected by temperatures significantly lower than the 120 degrees Celsius indicated above. At temperatures over, for example, 70 degrees Celsius the reducing agent might become unstable before possibly crystallising at somewhat higher temperatures and hence potentially causing obstruction of the dosing unit 250.

A third line 273 runs between the dosing unit 250 and the container 205. The third line 273 is adapted to leading back to the container 205 a certain amount of the reductant fed to the dosing unit 250. This configuration achieves with advantage cooling of the dosing unit 250. The dosing unit 250 is thus cooled by a flow of the reductant as it is pumped through the dosing unit 250 from the pump 230 to the container 205. Cooling of the dosing unit by a return flow of the third line may also be employed after the vehicle has been switched off and the exhaust flow in the exhaust duct has ceased. If this cooling proves to be insufficient for the dosing unit 250, it is possible with advantage to apply the innovative method comprising the step of evacuating to the exhaust duct 240 at least part of the reducing agent which has been warmed in the dosing unit 250.

A first control unit 200 is arranged for communication with a first temperature sensor 220 via a link 221. The first temperature sensor 220 is adapted to detecting a prevailing temperature of the dosing unit 250. The first temperature sensor 220 is adapted to continuously sending signals to the first control unit 200 which contain information about a prevailing first temperature T1 of the dosing unit 250.

The first control unit 200 is arranged for communication with the pump 230 via a link 231. The first control unit 200 is adapted to controlling operation of the pump 230 in order for example to regulate the reductant flows within the subsystem 299. The first control unit 200 is adapted to controlling an operating power of the pump 230 by regulating the associated electric motor.

The first control unit 200 is arranged for communication with a second temperature sensor 280 via a link 281. The second temperature sensor 280 is adapted to detecting a prevailing temperature T2 of the exhaust duct 240. The second temperature sensor 280 is adapted to continuously sending signals to the first control unit 200 which contain information about a prevailing temperature T2 of the exhaust duct 240.

The first control unit 200 is adapted to calculating a prevailing temperature of the dosing unit 250 on the basis of the signals received from the second temperature sensor 280.

The first control unit 200 is arranged for communication with the dosing unit 250 via a link 251. The first control unit 200 is adapted to controlling operation of the dosing unit 250 in order for example to regulate the reductant supply to the exhaust system of the vehicle 100. According to an example the first control unit 200 is adapted to controlling operation of the dosing unit 250 in order for example to regulate the reductant return supply to the container 205.

The first control unit 200 is adapted, according to a version, to using the signals received from the first temperature sensor 220 and/or the second temperature sensor 280 as a basis, where necessary, i.e. if there is found to be an undesired temperature level of said dosing unit, for removing warmed reductant from the latter by supplying it to said exhaust duct, which entails calculating and removing an amount of reducing agent which is removable on the basis of a prevailing temperature of the dosing unit, or removing a predetermined amount in the form of substantially all of the dosing unit's warmed reducing agent from it to said exhaust duct, in accordance with an aspect of the innovative method.

In particular, the first control unit 200 is adapted, according to a version, to using the signals received from the first temperature sensor 220 and/or the second temperature sensor 280 as a basis, where necessary, for calculating an amount of warmed reductant which is removable on the basis of a prevailing temperature of the dosing unit, in accordance with an aspect of the innovative method.

A second control unit 210 is arranged for communication with the first control unit 200 via a link 201. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. determining whether there is an undesired temperature level of the dosing unit 250 and, if there is, dosing a suitable amount of the dosing unit's warmed reducing agent into the exhaust duct 240. The innovative method may be applied by the first control unit 200 or the second control unit 210, or by both the first control unit 200 and the second control unit 210.

Figure 3A:
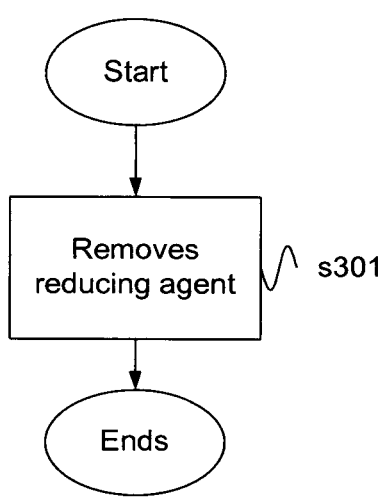
FIG. 3a is a schematic flowchart of a method according to an embodiment of the invention.

FIG. 3a is a schematic flowchart of a method pertaining to an SCR system for cleaning of exhaust gases from an engine which comprises a dosing unit to supply a reducing agent to an exhaust duct, according to an embodiment of the invention. The method comprises a first step s301. Method step s301 comprises the steps of determining whether there is an undesired temperature level of said dosing unit and, if there is found to be said undesired temperature level, removing warmed reducing agent from said dosing unit by supplying it to said exhaust duct, which entails calculating and removing an amount of reducing agent which is removable on the basis of a prevailing temperature of the dosing unit, or removing a predetermined amount in the form of substantially all of the dosing unit's warmed reducing agent from it to said exhaust duct. The method ends after step s301.

Figure 3B:
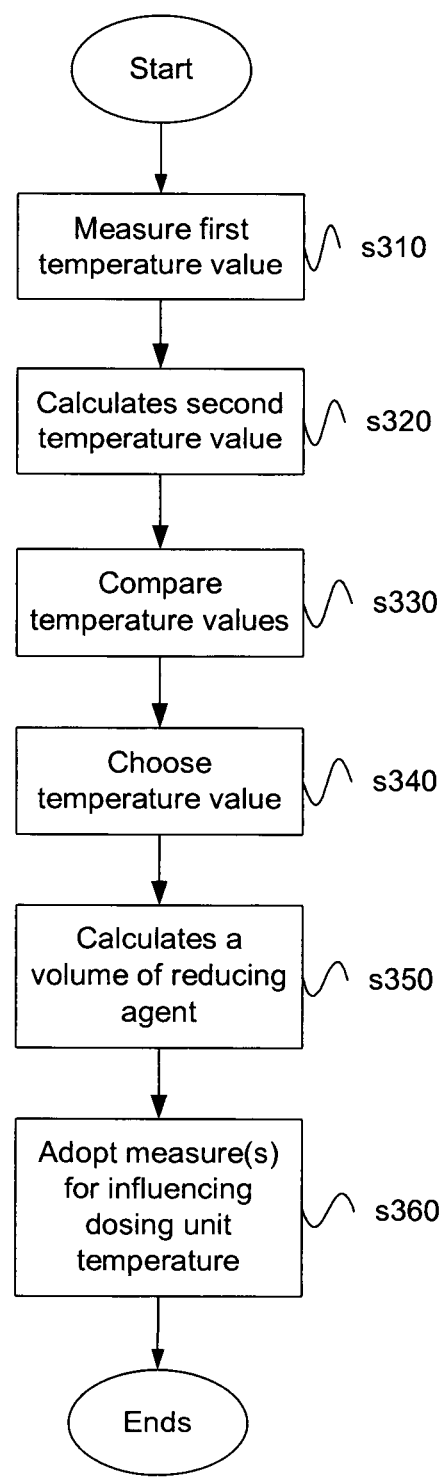
FIG. 3b is a more detailed schematic flowchart of a method according to an embodiment of the invention.

FIG. 3b is a schematic flowchart of a method pertaining to an SCR system for cleaning of exhaust gases from the engine 150 which comprises the dosing unit 250 to supply a reducing agent to the exhaust duct 240, according to an embodiment of the invention.

The method comprises a first step s310. Method step s310 comprises the step of determining a prevailing temperature of the dosing unit 250. This is done by direct measurement of prevailing temperatures adjacent to the dosing unit 250. Step s310 measures a first temperature value T1 which represents a prevailing temperature of the dosing unit 250. Step s310 is followed by a step s320.

Method step s320 comprises the step of determining indirectly an estimated prevailing temperature of the dosing unit 250. This is done by temperature measurement adjacent to some other component of the SCR system than the dosing unit 250. Step s320 measures a second temperature value T2 of some other component than the dosing unit 250. The measured temperature T2 may be used to determine a first estimated prevailing temperature T1est of the dosing unit 250. An alternative is that a second estimated prevailing temperature T2est of the dosing unit 250 may be determined (calculated) by means of a calculation model which has as input value some other parameter than temperatures of a component of the SCR system. Such an input parameter may for example be a prevailing load upon the engine 150. It should be noted that steps s310 and s320 may be performed substantially simultaneously, or in reverse order. It should also be noted that according to a version it is possible to use solely the measured temperature T1 of the dosing unit 250 for determining a highest temperature value Tmax as below. In certain cases it is advantageous to use both the measured temperature T1 and at least one of the estimated prevailing temperatures T1est and T2est for determining a highest temperature value Tmax as below, resulting in a more robust method. Step s320 is followed by a step s330.

Method step s330 comprises the step of comparing the determined first temperature T1 and at least one of the estimated prevailing temperatures T1est and T2est of the dosing unit 250. Step s330 is followed by a step s340.

Method step s340 comprises the step of using a result of said comparison between the determined first temperature T1 and at least one of the estimated prevailing temperatures T1est and T2est as a basis for choosing the highest among the values compared. This highest temperature value is also called Tmax. Step s340 comprises also the step of determining whether there is an undesired temperature level of the dosing unit, in cases where the dosing unit 250 is adapted to supplying reducing agent to an exhaust duct. This may be done by comparison with a limit value Tth such as a predetermined temperature value, e.g. 70 or 100 degrees Celsius, depending on which kind of reductant is used in the SCR system. If Tmax is greater than or equal to Tth, it may be found that there is an undesired temperature level of the dosing unit. If Tmax is smaller than Tth, it may be found that there is no undesired temperature level of the dosing unit. Step s340 is followed by a step s350.

According to an alternative version, it is possible, as described above, to determine whether there is an undesired temperature level of the dosing unit 250 on the sole basis of the measured temperature T1 of the dosing unit, resulting in a less complex method, according to an aspect of the invention.

Method step s350 comprises the step of using the chosen value Tmax as a basis for calculating an amount of reducing agent to be removed from the dosing unit 250. This may be done by means of stored calculation models. It is thus possible to determine a suitable dosing configuration, e.g. with regard to the respective amount of reducing agent to be removed at different times. Step s350 is followed by a step s360.

Method step s360 comprises the step of using the chosen value Tmax as a basis for adopting a measure for influencing the temperature of the dosing unit 250. A determined amount of reducing agent is then removed at a suitable time. The result is that various different amounts of reducing agent may be dosed at respective determined times. The method ends after step s360.

Figure 4:
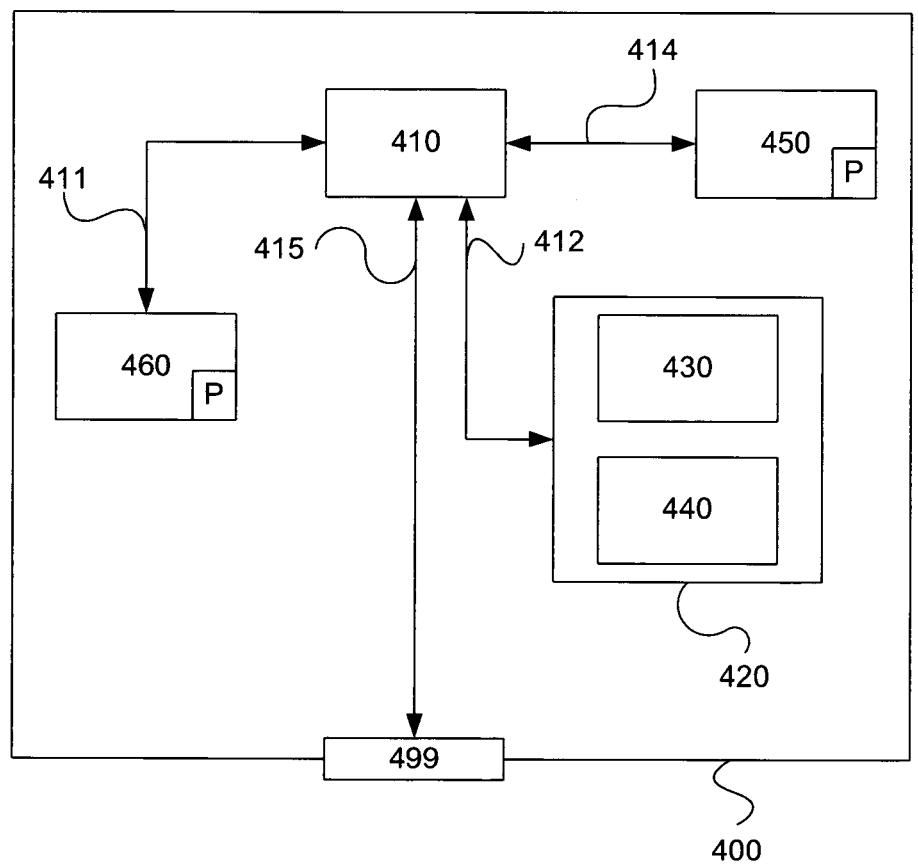
FIG. 4 illustrates schematically a computer according to an embodiment of the invention.

FIG. 4 is a diagram of a version of a device 400. The control units 200 and 210 described with reference to FIG. 2 may in a version comprise the device 400. The device 400 comprises a non-volatile memory 420, a data processing unit 410 and a read/write memory 450. The non-volatile memory 420 has a first memory element 430 in which a computer programme, e.g. an operating system, is stored for controlling the function of the device 400. The device 400 further comprises a bus controller, a serial communication port, I/O means, an A/D converter, a time and date input and transfer unit, an event counter and an interruption controller (not depicted). The non-volatile memory 420 has also a second memory element 440.

A proposed computer program P comprises routines for determining whether there is an undesired temperature level of a dosing unit 250 for supplying reducing agent to an exhaust duct. The program P comprises routines, when there is found to be an undesired temperature level, for removing warmed reducing agent from the dosing unit 250 by supplying it to the exhaust duct 240, which entails calculating and removing an amount of reducing agent which is removable on the basis of a prevailing temperature of the dosing unit, or removing a predetermined amount in the form of substantially all of the dosing unit's warmed reducing agent from it to said exhaust duct, according to an aspect of the innovative method. The program P comprises routines for continuously determining a prevailing temperature of the dosing unit in order to continuously determine whether there is an undesired temperature level of a dosing unit. The program P comprises routines for calculating an amount of warmed reducing agent which is removable on the basis of a prevailing temperature of the dosing unit. The program P comprises routines for continuously cooling the dosing unit 250 by means of a flow of said reducing agent.

The program P comprises routines for intermittently removing reducing agent from said dosing unit by supplying it to said exhaust duct.

The program P may be stored in an executable form or in a compressed form in a memory 460 and/or in a read/write memory 450.

Where the data processing unit 410 is described as performing a certain function, it means that the data processing unit 410 executes a certain part of the program stored in the memory 460, or a certain part of the program stored in the read/write memory 450.

The data processing device 410 can communicate with a data port 499 via a data bus 415. The non-volatile memory 420 is intended for communication with the data processing unit 410 via a data bus 412. The separate memory 460 is intended to communicate with the data processing unit 410 via a data bus 411. The read/write memory 450 is adapted to communicating with the data processing unit 410 via a data bus 414. The data port 499 may for example have the links 201, 221, 231, 251 and 281 connected to it (see FIG. 2).

When data are received on the data port 499, they are stored temporarily in the second memory element 440. When input data received have been temporarily stored, the data processing unit 410 is prepared to effect code execution as described above. According to a version, signals received on the data port 499 contain information about a first measured temperature T1 of the dosing unit 250. According to a version, signals received on the data port 499 contain information about a second measured temperature T2 of a component of the SCR system other than the dosing unit 250. The signals received on the data port 499 may where appropriate be used by the device 400 for removing warmed reducing agent from the dosing unit 250 of the SCR system.

Parts of the methods herein described may be effected by the device 400 by means of the data processing unit 410 which runs the programme stored in the memory 460 or the read/write memory 450. When the device 400 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method pertaining to an SCR system of an engine having an exhaust duct and the engine generates exhaust gases to the exhaust duct when the engine is operating, the system being configured and operable for cleaning of the exhaust gases from the engine;
the SCR system comprising a dosing unit to supply a reducing agent to said exhaust duct;
the method comprising the steps of:
continuously determining a prevailing temperature within said dosing unit in order to determine whether there is an undesired temperature level within said dosing unit;
determining whether there is said undesired temperature level within said dosing unit; and
removing warmed reducing agent from said dosing unit by supplying said removed reducing agent to said exhaust duct if said undesired temperature is found, said removal of said warmed reducing unit comprising:
calculating and removing an amount of said reducing agent based on a prevailing temperature within said dosing unit or removing a predetermined amount comprised of all of said warmed reducing agent in said dosing unit and transferring said removed reducing agent from said dosing unit to said exhaust duct,
wherein said step of removing said warmed reducing agent from said dosing unit comprises removing said warmed reducing agent from said dosing unit by existing pressurisation of said warmed reducing agent in said dosing unit.

2. The method according to claim 1, wherein the engine ceases generating exhaust flow; and
said determination of whether there is said undesired temperature level is done after said cessation of said exhaust flow.

3. The method according to claim 1, further comprising continuously cooling said dosing unit by a flow of said reducing agent to said dosing unit.

4. The method according to claim 1, further comprising intermittently removing said reducing agent from said dosing unit by supplying said removed reducing agent to said exhaust duct.

5. The method according to claim 1, wherein said undesired temperature level is within a predetermined range.

6. The method according to claim 1, wherein said reducing agent is a urea-based reducing agent.

7. An electronic control unit of an SCR system for cleaning of exhaust gases from an engine wherein said SCR system comprises a dosing unit to supply a reducing agent to an exhaust duct of said engine, said electronic control unit of said SCR system being configured to:
continuously determine a prevailing temperature within said dosing unit in order to determine whether there is an undesired temperature level within said dosing unit;
determine whether there is said undesired temperature level within said dosing unit;
remove warmed reducing agent from said dosing unit and supply said removed reducing agent to said exhaust duct if said electronic control unit determines that said undesired temperature level of said dosing unit exists; and
calculate and remove from said dosing unit an amount of said reducing agent based on a prevailing temperature within said dosing unit or remove a predetermined amount in the form of all of said warmed reducing agent from the dosing unit and transferring said removed reducing agent to said exhaust duct,
wherein said removal of said reducing agent from said dosing unit comprises removing said reducing agent from said dosing unit by existing pressurisation of said reducing agent in said dosing unit.

8. The electronic control unit according to claim 7, wherein said engine generates an exhaust flow when said engine is operating and ceases generating said exhaust flow when said engine is not operating; and
said determination of whether there is said undesired temperature level is performed after said cessation of said exhaust flow.

9. The electronic control unit according to claim 7, wherein the electronic control unit is further configured to:
continuously cool said dosing unit by generating a flow of said reducing agent to said dosing unit.

10. The electronic control unit according to claim 7, wherein said electronic control unit is further configured to intermittently remove said reducing agent from said dosing unit by supplying the removed dosing agent to said exhaust duct.

11. The electronic control unit according to claim 7, wherein said undesired temperature level is within a predetermined range.

12. The electronic control unit according to claim 7, wherein the electronic control unit is further configured to:
remove said reducing agent from said dosing unit by existing pressurisation of said reducing agent in said dosing unit.

13. A motor vehicle comprising the electronic control unit according to claim 7.

14. A motor vehicle according to claim 13, comprising one of a truck, bus or passenger car.

15. A non-transitory computer-readable medium on which is stored a computer program product pertaining to an SCR system for exhaust cleaning of an engine, wherein said computer program product comprises program code with program instructions for causing an electronic control unit to perform steps according to claim 1 or causing another computer connected to the electronic control unit to perform such steps when instructions in said code are run on said electronic control unit or on said computer, respectively.

16. The method according to claim 1, wherein said undesired temperature level is within a range of 80-130 degrees Celsius.

17. The electronic control unit according to claim 7, wherein said undesired temperature level is within a range of 80-130 degrees Celsius.

18. The electronic control unit according to claim 7, wherein said dosing unit is at said exhaust duct where said dosing unit is heated.

19. The method according to claim 1, wherein said SCR system further comprises a container supplying said reducing agent to said dosing unit and receiving said reducing agent from said dosing unit and said method further comprises returning a portion of said reducing agent to said container from said dosing unit to cool said dosing unit.

20. The electronic control unit according to claim 7, wherein said SCR system further comprises a container supplying said reducing agent to said dosing unit and receiving said reducing agent from dosing unit and said electronic control unit is further configured to control operation of said dosing unit to regulate return of said reducing agent to said container from said dosing unit to cool said dosing unit.

21. The method according to claim 1, wherein all of said warmed reducing agent in said dosing unit is transferred to said exhaust duct when said undesired temperature is found.

22. The electronic control unit of claim 7, wherein the electronic control unit transfers all of said warmed reducing agent in the dosing unit to said exhaust duct based on a prevailing temperature within said dosing unit.

23. The method according to claim 1, wherein the step of continuously determining a prevailing temperature within said dosing unit comprises:
at least one of:
detecting a prevailing temperature of the dosing unit by a first temperature sensor; and
detecting a prevailing temperature of the exhaust duct by a second temperature sensor.

24. The electronic control unit of claim 7, wherein said electronic control unit of said SCR system being configured to continuously determine a prevailing temperature within said dosing unit comprises:
at least one of:
detecting a prevailing temperature of the dosing unit by a first temperature sensor; and
detecting a prevailing temperature of the exhaust duct by a second temperature sensor.

* * * * *